United States Patent
Brown

(10) Patent No.: US 7,631,269 B2
(45) Date of Patent: *Dec. 8, 2009

(54) UTILITY, METHOD AND DEVICE PROVIDING VECTOR IMAGES THAT MAY BE UPDATED TO REFLECT THE PHYSICAL STATES OF CONFIGURABLE COMPONENTS OF A DEVICE

(75) Inventor: Christopher William Brown, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 503 days.

This patent is subject to a terminal disclaimer.

(21) Appl. No.: 11/261,136

(22) Filed: Oct. 27, 2005

(65) Prior Publication Data

US 2007/0097135 A1 May 3, 2007

(51) Int. Cl.
*G06F 3/048* (2006.01)

(52) U.S. Cl. .................. 715/771; 715/866; 715/772; 715/764; 709/217; 709/219; 345/629; 345/581

(58) Field of Classification Search ............... 715/771, 715/772, 866, 764; 345/581, 629, 473, 619; 709/217, 219, 231
See application file for complete search history.

(56) References Cited

U.S. PATENT DOCUMENTS

| | | | | |
|---|---|---|---|---|
| 5,832,298 | A * | 11/1998 | Sanchez et al. ............... 710/8 |
| 6,133,919 | A * | 10/2000 | Bormann et al. ............ 715/839 |
| 6,470,073 | B1 * | 10/2002 | Fish et al. ................. 379/32.01 |
| 6,771,288 | B2 * | 8/2004 | Boulter ...................... 715/736 |
| 6,779,027 | B1 * | 8/2004 | Schunicht et al. ........... 709/223 |
| 7,299,202 | B2 * | 11/2007 | Swanson ...................... 705/27 |
| 7,321,896 | B1 * | 1/2008 | Ohashi ....................... 707/102 |
| 7,373,342 | B2 * | 5/2008 | Cragun et al. .................. 707/4 |
| 7,441,018 | B1 * | 10/2008 | Shafer et al. ................ 709/220 |
| 2001/0033284 | A1 * | 10/2001 | Chan .......................... 345/441 |
| 2002/0131072 | A1 * | 9/2002 | Jackson .................... 358/1.15 |
| 2003/0090459 | A1 | 5/2003 | Lapstun et al. |
| 2003/0120822 | A1 * | 6/2003 | Langrind et al. ............ 709/251 |
| 2003/0154266 | A1 | 8/2003 | Bobick et al. |
| 2004/0030778 | A1 | 2/2004 | Kronenberg et al. |
| 2004/0083138 | A1 | 4/2004 | Silverbrook et al. |
| 2004/0093559 | A1 | 5/2004 | Amaru et al. |
| 2004/0104928 | A1 * | 6/2004 | Morioka ..................... 345/736 |
| 2004/0189677 | A1 * | 9/2004 | Amann et al. ............... 345/660 |
| 2004/0223197 | A1 * | 11/2004 | Ohta et al. ................... 358/538 |
| 2005/0108364 | A1 * | 5/2005 | Callaghan et al. .......... 709/219 |
| 2006/0010246 | A1 * | 1/2006 | Schulz et al. ............... 709/232 |
| 2007/0139441 | A1 * | 6/2007 | Lucas et al. ................ 345/619 |
| 2007/0249385 | A1 * | 10/2007 | Doi et al. ................. 455/550.1 |

* cited by examiner

Primary Examiner—Tadeese Hailu

(57) ABSTRACT

In one embodiment, in response to receiving an image request, a computer-implemented method 1) retrieves a vector image from a device that is a target of the image request, the vector image illustrating at least a portion of the device; 2) retrieves physical state information for a configurable component of the device; 3) formats the vector image in response to the physical state information by, A) identifying a component state tag within the vector image, the component state tag being associated with the configurable component and a set of vectors defining a component state image, and B) in accord with the physical state information, setting a display indicator corresponding to the component state tag, the display indicator affecting display of the component state image during display of the vector image; and 4) returns a formatted version of the vector image. Other embodiments are also disclosed.

12 Claims, 4 Drawing Sheets

UTILITY, METHOD AND DEVICE PROVIDING VECTOR IMAGES THAT MAY BE UPDATED TO REFLECT THE PHYSICAL STATES OF CONFIGURABLE COMPONENTS OF A DEVICE

BACKGROUND

The management of a device is typically aided by providing its user with a means to graphically visualize the device. In some cases, one or more images of a device and its components may be included within paper or electronic documentation (e.g., a user manual). In other cases, a device may be provided with stickers showing one or more views of the device's interior components.

In still other cases, images of a device may be incorporated into a management tool for the device. For example, a print driver may display an image of the printer to which it corresponds, or a server management tool may display various images associated with the server components of which the management tool is aware or can manage (e.g., the server's memory modules, interfaces, or storage disks).

Many devices for which graphical images are needed are subject to change. That is, the devices may be upgradeable such that additional components (e.g., memory modules, interfaces, or storage disks) may be inserted into or attached to the device. Thus, an issue facing the image creator is whether to draw an image of each configuration of the device or draw a single "exemplary" image in which the device is depicted in one particular "default" configuration.

A device may also be subject to change over its lifecycle. That is, the styling of the device's exterior, the suppliers of its internal components, its "default" configuration, and even its available features can change over its lifecycle. Thus, any images pertaining to the first generation of the device may not accurately depict later generations of the device.

As one can appreciate, the creation and maintenance of graphical images for a device can present a significant burden for both device manufacturers and third-party device supporters (e.g., management tool developers).

SUMMARY OF THE INVENTION

In one embodiment, an image formatting utility comprises code to, in response to receiving an image request, 1) retrieve a vector image from a device that is a target of the image request, the vector image illustrating at least a portion of the device; 2) retrieve physical state information for a configurable component of the device; 3) format the vector image in response to the physical state information by, A) identifying a component state tag within the vector image, the component state tag being associated with the configurable component and a set of vectors defining a component state image; and B) in accord with the physical state information for the configurable component, setting a display indicator corresponding to the component state tag, the display indicator affecting display of the component state image during display of the vector image; and 4) return a formatted version of the vector image.

In another embodiment, an article of manufacture comprises computer-readable media, and computer-readable code that is stored on the computer-readable media. The computer-readable code includes code to, in response to receiving an image request, 1) retrieve a vector image from a device that is a target of the image request; 2) retrieve physical state information for a configurable component of the device, the vector image illustrating at least a portion of the device; 3) format the vector image in response to the physical state information by, A) identifying a component state tag within the vector image, the component state tag being associated with i) the configurable component, and ii) a set of vectors defining a component state image; and B) in accord with the physical state information for the configurable component, setting a display indicator corresponding to the component state tag, the display indicator affecting display of the component state image during display of the vector image; and 4) return a formatted version of the vector image.

In yet another embodiment, a computer-implemented method for formatting images of a device comprises, in response to receiving an image request, 1) retrieving a vector image from a device that is a target of the image request, the vector image illustrating at least a portion of the device; 2) retrieving physical state information for a configurable component of the device; 3) formatting the vector image in response to the physical state information by, A) identifying a component state tag within the vector image, the component state tag being associated with the configurable component and a set of vectors defining a component state image; and B) in accord with the physical state information for the configurable component, setting a display indicator corresponding to the component state tag, the display indicator affecting display of the component state image during display of the vector image; and 4) returning a formatted version of the vector image.

In still another embodiment, a device comprises a non-volatile memory in which an image illustrating at least a portion of the device is stored. The image comprises a plurality of vectors and a component state tag. The component state tag is associated with a configurable component of the device, a set of vectors defining a component state image, and an editable display indicator that affects display of the component state image during display of the vector image. The device also comprises an interface to, upon receiving a request for the vector image, return the vector image.

Other embodiments are also disclosed.

BRIEF DESCRIPTION OF THE DRAWINGS

Illustrative embodiments of the invention are illustrated in the drawings, in which.

DETAILED DESCRIPTION

One development that has eased the burden of creating and maintaining graphical images for a device is the electronic storage of a device's images within the device itself. For example, different images pertaining to different views and/ or components of a device may be saved as Scalable Vector Graphics (SVG) images, or other easy-to-manipulate image types, and stored within a non-volatile memory of the device (preferably, but not always, in the device's firmware). Thus, a management tool for the device no longer needs to provide its own set of images for the device. Rather, the management tool need only be provided with abilities to 1) query the device to retrieve an image of the device, and 2) format the image to reflect the current state of the device. In this manner, the developer of the management tool need not be concerned with how the device looks, and can instead focus on how the device functions and is managed.

Figure 1:
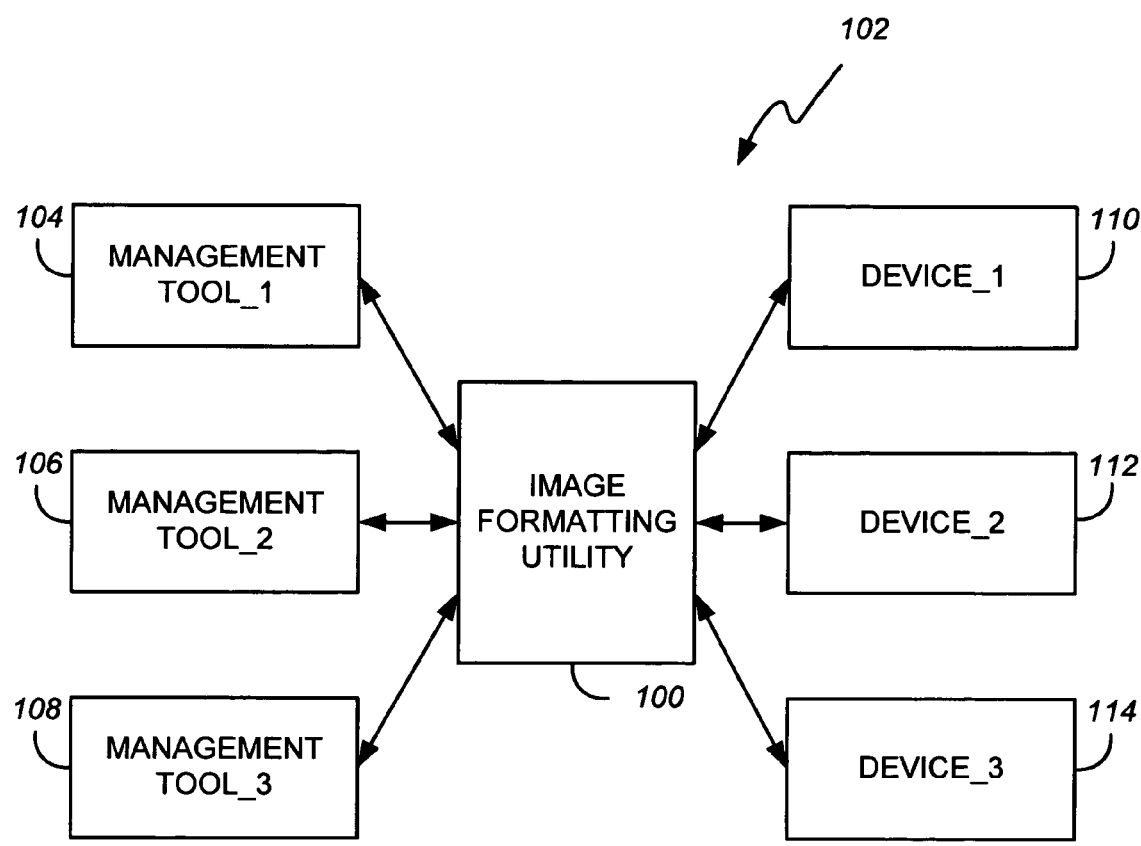
FIG. 1 illustrates an exemplary system in which an image formatting utility may be used.

To further ease a management tool developer's burden of having to work with device images, an image formatting utility 100 (FIGS. 1 & 2), and system incorporating same, are disclosed herein. By way of example, the "utility" 100 may take the form of an application or browser plug-in that is embodied in computer-readable code stored on one or more computer-readable media. The computer-readable media may include, for example, any number or mixture of fixed or configurable media (such as one or more fixed disks, random access memories (RAMs), read-only memories (ROMs), or compact discs), at either a single location or distributed over a network.

Before describing the image formatting utility 100 in detail, an exemplary system 102 (FIG. 1) in which the image formatting utility 100 may be used will be described.

The system 102 comprises one or more device management tools 104, 106, 108 for generating image requests, and one or more devices 110, 112, 114 that may be targets of the image requests. Each of the devices 110-114 is provided with a non-volatile memory in which one or more images (i.e., an image set) illustrating at least a portion of the device is stored. Assuming that the management tools 104-108 and devices 110-114 comprise interfaces that are compatible with those of the image formatting utility 100, the utility 100 may 1) receive plural image requests from any one or more of the management tools 104-108, and 2) in responding to the plural image requests, format images retrieved from a plurality of the devices 110-114 and return the formatted images to the requesting ones of the management tools 104-108. Of note, the management tools 104-108 and devices 110-114 of the system 102 have no direct link to, nor dependence on, each other. Thus, one or the other can easily be modified or appended to without affecting the other. Furthermore, the image(s) stored within the devices 110-114 can be updated without any need to worry about how the updated images will be drawn by the utility 100 or the management tools 104-108.

The management tools 104-108 of the system 102 may take various forms, including, for example, those of a: print driver, configuration manager, licensing manager, server manager, system manager, or network manager. In one embodiment of the system 102, one or more of the device management tools 104-108 may present a user interface (e.g., a graphical user interface (GUI)) through a web browser.

The devices 110-114 of the system 102 may also take various forms, including, for example, those of a: server, computer system, printer, or network. Further, the devices in which images are stored may be parts of other devices. For example, images may be stored in a memory of a computer motherboard, while additional images may be stored in a configurable video or networking card that has been inserted into a slot of the motherboard.

In one embodiment, the image or images (i.e., image set) stored within a device comprise SVG images. SVG is a language for describing two-dimensional graphics and graphical applications in eXtensible markup language (XML). SVG specifications are published by the World Wide Web Consortium (W3C®). SVG images are particularly suited to being stored in a device as a result of their small storage requirements, scalable size, and configurability. Alternately, a device's image set may comprise other types of easy-to-manipulate images, such as other vector-based images (e.g., postscript images).

Each device 110-114 may store its image set in a non-volatile memory. The images in each image set illustrate at least a portion of the device in which they are stored, and in some cases may illustrate different portions or views of the device. For purposes which will become clear later in this description, one or more of the stored images may be vector images comprising a number of embedded component state tags, each tag of which is associated with 1) a configurable component of the device in which the image is stored, 2) a set of vectors defining a different one of a number of component state images, and 3) an editable display indicator that affects display of the component state image during display of the vector image.

In a simple embodiment, each of the devices 110-114 need only have an ability to fetch and return its stored image set (possibly only one image). However, in other embodiments, a device interface may have an ability to fetch a particular image (e.g., via address, number or type). A device interface may also return component presence and component "physical state" information for the device, although it need not.

Although the exemplary system 102 illustrates the utility 100 being stored and executed apart from any management tool 104-108 or device 110-114, the utility 100 could alternately be stored and executed locally to a particular management tool or device (e.g., within the device).

Figure 2:
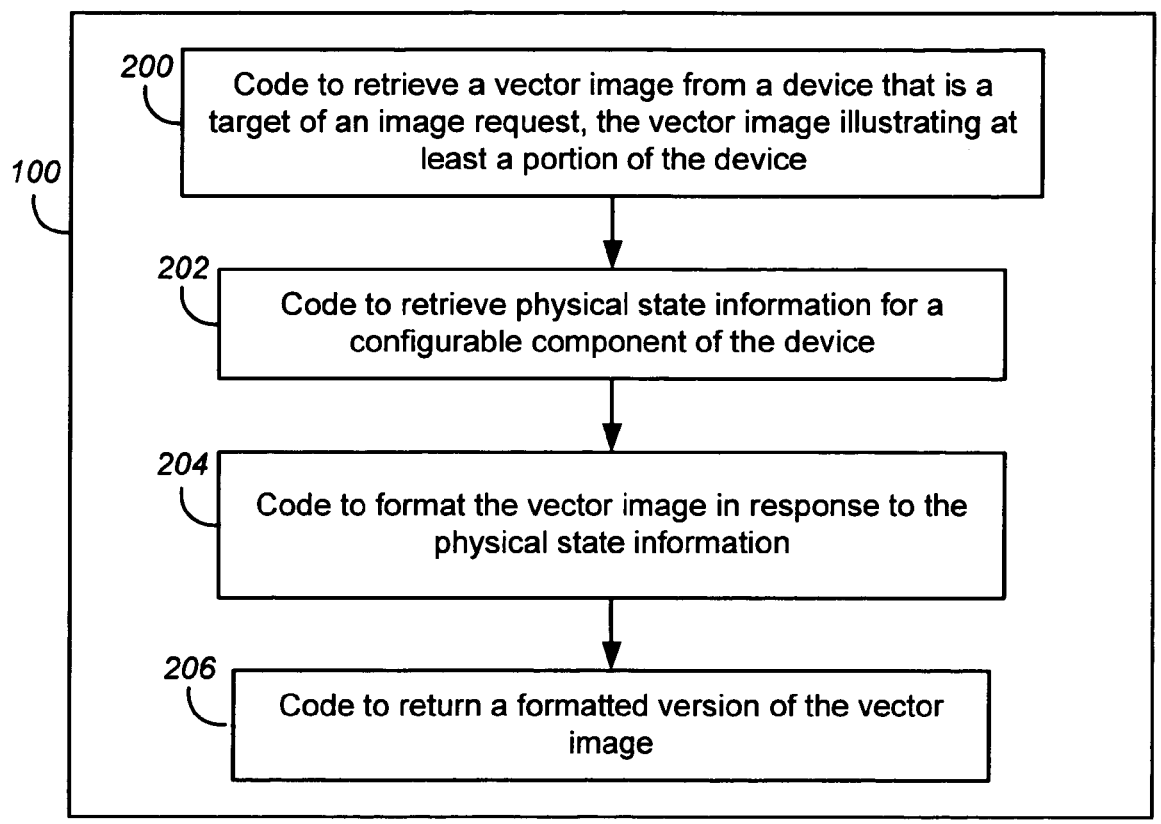
FIG. 2 illustrates a first exemplary embodiment of the image formatting utility shown in FIG. 1.

Having described exemplary contexts in which the utility 100 may be used, the utility 100 will now be described in greater detail. As shown in FIG. 2, the utility 100 comprises code 200 to, in response to receiving an image request from a device management tool, retrieve a vector image from a device that is a target of the image request. Before, during or after retrieval of the vector image, code 202 retrieves physical state information for a configurable component of the device. For example, the code 202 may retrieve physical state information for a movable component (or movable part of a component), such as a switch, jumper, door, lid or retaining mechanism (e.g., clips that retain a processor or memory card). When a plurality of configurable components may be installed on a device, code 202 preferably retrieves physical state information for all of the components.

In one embodiment, code 200 first retrieves a vector image, and code 202 then parses the vector image to identify a set of configurable components for which physical state information is needed. In another embodiment, code 202 merely issues a general query for a device's physical state information.

In one embodiment, queries issued by the code 202 are made to the device from which a vector image is retrieved. Alternately (or additionally), the utility 100 may retrieve physical state information from an operating system that interfaces with the device, or from one or more management tools of which the utility 100 is aware.

After retrieving the physical state information, code 204 formats the vector image in response to the physical state information. This is done by first identifying a component state tag within the vector image, the tag being associated with 1) the configurable component, and 2) a set of vectors defining a component state image. Then, in accord with the physical state information for the configurable component, a display indicator corresponding to the component state tag is set. By setting the display indicator, display of the component state image during display of the vector image is affected.

Figure 3:
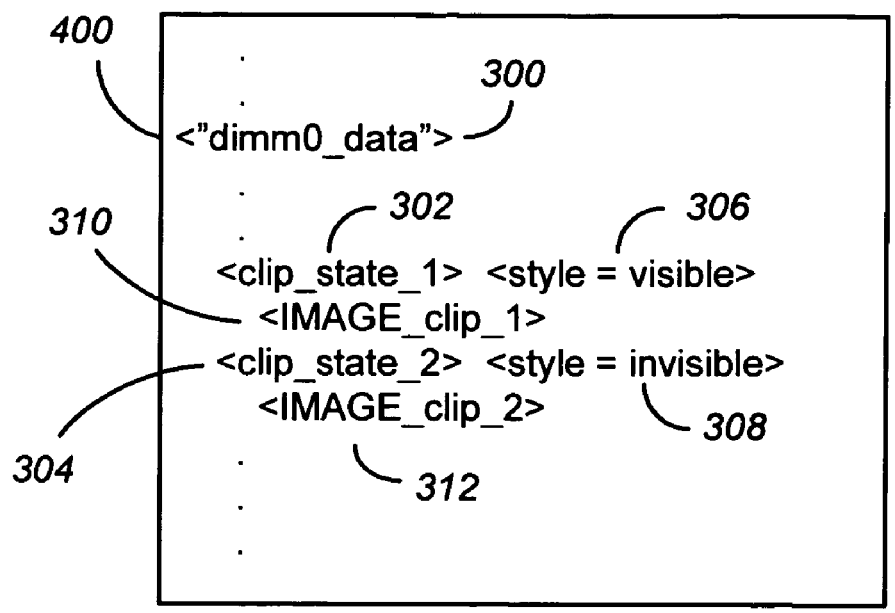
FIG. 3 illustrates an exemplary vector image wherein a display indicator associated with a component state image, "IMAGE_clip__1", is set to "visible"
Figure 4:
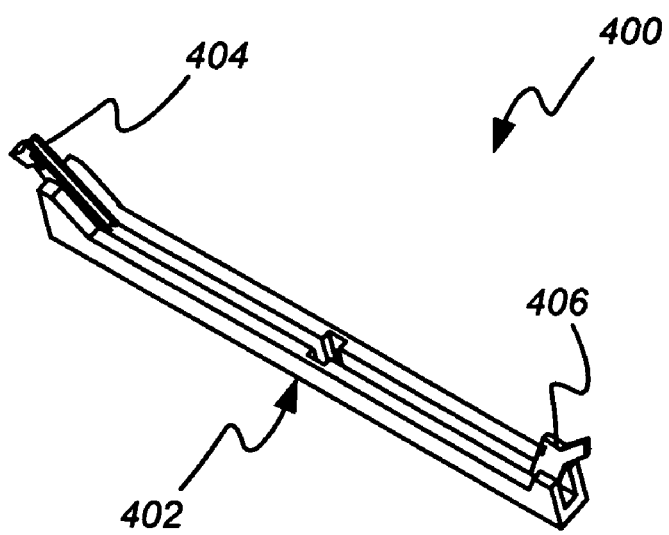
FIG. 4 illustrates a display of the vector image shown in FIG. 3.

For example, FIG. 3 illustrates a text description of an exemplary vector image 400; and FIG. 4 illustrates a display of the vector image 400. As shown, the vector image 400 (FIG. 3) comprises vectors 300 for drawing a dual in-line memory (DIMM) slot (i.e., "dimm0_data"). Within the definition of the DIMM slot 402 (FIG. 4) are two component state tags 302, 304 (i.e., "clip_state_1" and "clip_state_2"). By way of example, the first component state tag may correspond to an "open" state of a pair of clips 404, 406 (FIG. 4) for retaining a DIMM in the DIMM slot 402. Conversely, the second component state tag may correspond to a "closed" state of the clips 404, 406.

If physical state information acquired for the DIMM slot 402 and/or its clips 404, 406 indicates that the clips 404, 406 are "open", then a display indicator 306 (i.e., "style=") associated with the tag "clip_state_1" may be set to "visible"; and a display indicator 308 associated with the tag "clip_state_2" may be set to "invisible". In this manner, and upon display of the vector image 400 (see FIG. 4), the component state image 310 (i.e., "IMAGE_clip_1") will be displayed; and the component state image 312 (i.e., "IMAGE_clip_2") will be suppressed.

Figure 5:
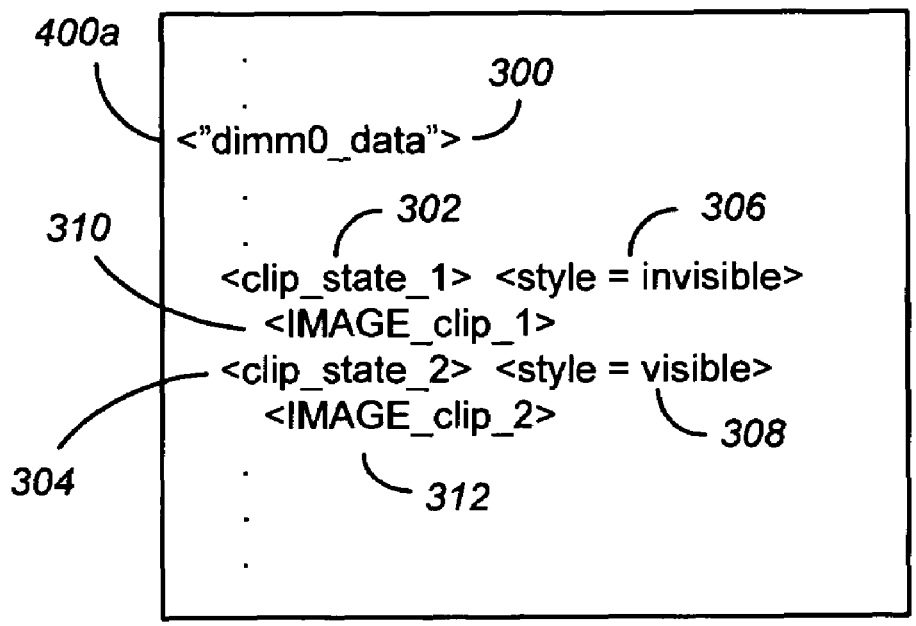
FIG. 5 illustrates a modification of the vector image shown in FIG. 3, wherein the display indicator associated with the component state image "IMAGE_clip__1" is set to "invisible", and wherein the display indicator associated with the component state image "IMAGE_clip__2" is set to "visible"
Figure 6:
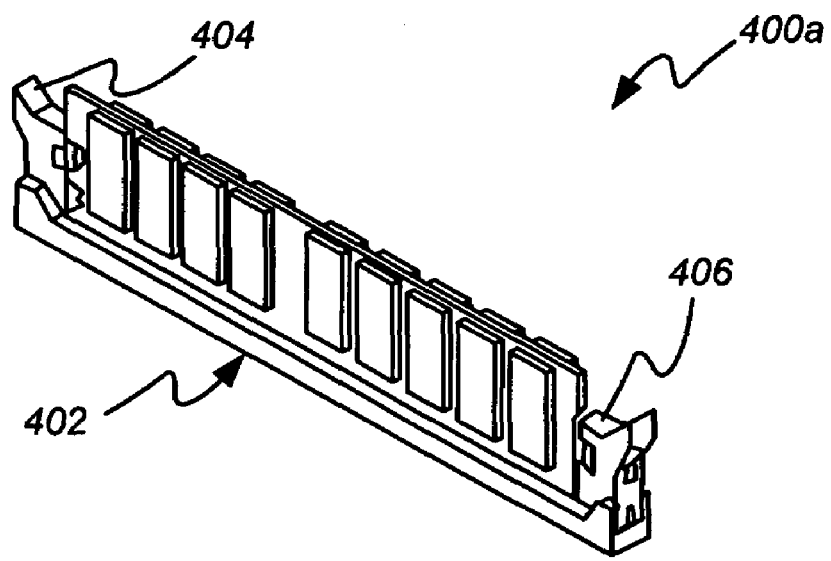
FIG. 6 illustrates a display of the vector image shown in FIG. 5.

FIGS. 5 & 6 respectively illustrate another text and graphic version 400a of the vector image 400. In the vector image 400a, however, physical state information has indicated that the clips 404, 406 are "closed". The display indicator 306 has therefore been set to "invisible"; and the display indicator 308 has been set to "visible". See FIG. 5. In this manner, and upon display of the vector image 400a (see FIG. 6), the component state image 312 (i.e., "IMAGE_clip_2") will be displayed; and the component state image 310 (i.e., "IMAGE_clip_1") will be suppressed. FIG. 6 also illustrates the drawing of a DIMM 600, the definition of which may also be contained in the vector image 400 (see FIG. 5). In some cases, vectors may be grouped within the vector image 400 such that the setting of a single display indicator influences the drawing of both the DIMM 600 and the state of its clips 404, 406. However, in other cases, display indicators are provided for separately determining whether to draw 1) the DIMM 600, and 2) its clips 404, 406.

Because the component state images 310, 312 are contained within the vector image 400 and 400a, their placements, sizes and orientations with respect to the vector images 400 and 400a are fixed, and there is no need to determine how to display the component state images 310, 312 when physical state information indicates that one or the other of the images 310, 312 should be drawn.

Note that display indicators, such as "style=visible", may be included within a vector image by default. Alternately, they may be written into a vector image upon 1) the identification of the various component state tags that are included within the vector image, and 2) the retrieval of the physical state information that is required to set or write the display indicators.

Although the exemplary vector images 400, 400a shown in FIGS. 3-6 are provided in the context of a configurable component having two physical states (i.e., open or closed), the utility 100 could also format vector images that include configurable components having more than two physical states (e.g., a three-state switch). Further, and in one embodiment, the utility 100 could format a vector image in which a first (or default) physical state is always drawn, and then a second physical state is indicated by drawing vectors corresponding to the second physical state "on top of" the vectors that draw the first physical state, thereby "covering up" some or all of the vectors that draw the first physical state. Note that in such an embodiment, the utility 100 would only have to set a single display indicator corresponding to a single component state tag.

Instead of (or in addition to) the display indicators of "visible" and "invisible", a display indicator may be set to make a component state image opaque (if a component is configured in a state corresponding to the image) or translucent (if a component is configured in a state other than that which corresponds to the image). A display indicator could also be set to cause a component state image to be drawn in one of a plurality of colors (e.g., black if a component is configured in a state corresponding to the image, or red if a component is not configured in a state corresponding to the image). In this manner, a person viewing an image of the device might be alerted to the other physical states in which the device might be placed.

Upon formatting a vector image using physical state information, code 206 (FIG. 2) returns a formatted version of the vector image to the device management tool that requested the image.

In some cases, the formatted image returned by the code 206 may comprise a formatted image that is in the native format of a retrieved vector image (e.g., an SVG format). In other cases, the formatting of a vector image may comprise rendering the image (i.e., converting the image to a raster-based format).

As previously indicated, the code 200-206 may be included within a utility 100 that stands apart from other management tools 104-108 and devices 110-114. Alternately, instances of the code 200-206 may be provided as part of the management tools 104-108, or may be stored and executed by the devices 110-114.

Although the above description has primarily focused on the setting of display indicators for component state images corresponding to one configurable component, it is envisioned that the code 200-206 disclosed herein may be used to simultaneously set the display indicators for multiple configurable components.

What is claimed is:
1. An article of manufacture, comprising:
computer-readable media; and
computer-readable code, stored on the computer-readable media, including code to, in response to receiving an image request,
  retrieve a vector image from a device that is a target of the image request;
  retrieve physical state information for a configurable component of the device, wherein the configurable component is a retaining mechanism, and wherein the physical state information indicates a state of the retaining mechanism, the vector image illustrating at least a portion of the device;
  format the vector image in response to the physical state information by,
    identifying a component state tag within the vector image, the component state tag being associated with i) the configurable component, and ii) a set of vectors defining a component state image; and
    in accord with the physical state information for the configurable component, setting a display indicator corresponding to the component state tag, the display indicator affecting display of the component state image during display of the vector image; and
  return a formatted version of the vector image.

2. The image formatting utility of claim 1, further comprising code to, in response to receiving the image request, format the vector image in response to the physical state information by, identifying at least one additional component state tag within the vector image, wherein each of the component state tags is associated with i) the configurable component, and ii) a component state image reflecting a different state of the configurable component; and in accord with the physical state information for the configurable component, setting different display indicators corresponding to different ones of the component state tags.

3. The image formatting utility of claim 1, wherein the code to format the vector image sets the display indicator to make the component state image visible or invisible.

4. The image formatting utility of claim 1, wherein the code to format the vector image sets the display indicator to make the component state image opaque or translucent.

5. The image formatting utility of claim 1, wherein the code to format the vector image sets the display indicator to cause the component state image to be drawn in one of a plurality of colors.

6. The image formatting utility of claim 1, wherein the physical state information indicates a position of a movable part of the configurable component.

7. The image formatting utility of claim 6, wherein the movable part of the configurable component is a switch.

8. A computer-implemented method for formatting images of a device, comprising:

in response to receiving an image request, retrieving a vector image from a device that is a target of the image request, the vector image illustrating at least a portion of the device;

retrieving physical state information for a configurable component of the device, wherein the configurable component is a retaining mechanism, and wherein the physical state information indicates a state of the retaining mechanism;

formatting the vector image in response to the physical state information by, identifying a component state tag within the vector image, the component state tag being associated with i) the configurable component, and ii) a set of vectors defining a component state image; and in accord with the physical state information for the configurable component, setting a display indicator corresponding to the component state tag, the display indicator affecting display of the component state image during display of the vector image; and returning a formatted version of the vector image.

9. The method of claim 8, further comprising, in response to receiving the image request, formatting the vector image in response to the component status information by, identifying at least one additional component state tag within the vector image, wherein each of the component state tags is associated with i) the configurable component, and ii) a component state image reflecting a different state of the configurable component; and in accord with the physical state information for the configurable component, setting different display indicators corresponding to different ones of the component state tags.

10. The method of claim 8, wherein formatting the vector image further comprises setting the display indicator to make the component state image visible or invisible.

11. The method of claim 8, wherein the physical state information indicates a position of a movable part of the configurable component.

12. The method of claim 11, wherein the movable part of the configurable component is a switch.

\* \* \* \* \*

UNITED STATES PATENT AND TRADEMARK OFFICE
CERTIFICATE OF CORRECTION

PATENT NO. : 7,631,269 B2  
APPLICATION NO. : 11/261136  
DATED : December 8, 2009  
INVENTOR(S) : Christopher William Brown Page 1 of 1

It is certified that error appears in the above-identified patent and that said Letters Patent is hereby corrected as shown below:

In column 7, line 1, in Claim 2, delete "image formatting utility" and insert -- article of manufacture --, therefor.

In column 7, line 14, in Claim 3, delete "image formatting utility" and insert -- article of manufacture --, therefor.

In column 7, line 17, in Claim 4, delete "image formatting utility" and insert -- article of manufacture --, therefor.

In column 7, line 20, in Claim 5, delete "image formatting utility" and insert -- article of manufacture --, therefor.

In column 7, line 24, in Claim 6, delete "image formatting utility" and insert -- article of manufacture --, therefor.

In column 7, line 27, in Claim 7, delete "image formatting utility" and insert -- article of manufacture --, therefor.

Signed and Sealed this

Eighteenth Day of May, 2010

David J. Kappos  
*Director of the United States Patent and Trademark Office*